Patented May 26, 1942

2,283,900

UNITED STATES PATENT OFFICE 2,283,900

PROCESS FOR PRODUCING RESINS OF THE SULPHUR DIOXIDE-OLEFIN TYPE

Maxwell M. Barnett, Port Sulphur, La., assignor to Freeport Sulphur Company, New York, N. Y., a corporation of Delaware No Drawing. Application February 7, 1939, Serial No. 255,051

10 Claims. (Cl. 260—94)

This invention relates to resins of the sulphur dioxide-olefin type and to new and improved processes for producing them.

It has long been known that resinous polymerization products may be produced under proper conditions by the reaction of sulphur dioxide with active unsaturated organic compounds of the olefin type, of which the mono-olefins like ethylene, propylene, butene-1, butene-2, isobutene, pentene-1 and pentene-2 are examples. Other examples of such unsaturated compounds are butadiene, pentadiene and other conjugated diolefins; pentyne-1, hexyne-1 and other acetylenes; and polyfunctional unsaturated compounds of the nature of allyl alcohol and allyl ethers.

This polymerization reaction is usually carried out with an excess of sulphur dioxide in a sealed glass tube or steel bomb, at comparatively low temperatures and in the presence of a catalyst. Among the catalysts which have been proposed heretofore are light of the proper wave length, oxidizing compounds such as certain peroxides, nitric acid and silver nitrate, and certain organometallic compounds, such as tetraethyl lead.

The commercial development of sulphur dioxide-olefin resins has been hindered by the lack of catalysts of sufficient activity. Most of the known catalysts require many hours and even days to complete the polymerization to a point giving a practical yield of resin, and in many cases the resinous product is contaminated or discolored to such an extent, or has such an undesirable physical condition, that it possesses little or no practical value for use as a moulding material, as a base for lacquers, etc., or as a plastic in other fields.

A catalyst that has been considered desirable for bringing about the reaction between sulphur dioxide and olefins is the naturally-occurring terpene peroxide, known as ascaridole. When using ascaridole, good yields of polymer can be obtained in a fairly reasonable time as compared with other known catalysts; for example, yields of as high as 85% are obtainable within an hour and a half when producing butene-1 resin. On the other hand, the use of ascaridole according to known processes does not give nearly as rapid production as desired for commercial operation, and the product of the reaction is discolored to an objectionalble extent and very difficult to convert to a useful physical condition. Furthermore, the catalytic activity of ascaridole, when used according to prior processes, seems to be relatively high only when a considerable excess of sulphur dioxide is present in the reaction mixture. This fact leads to difficulties in purifying the resinous product.

An object of my present invention is to provide an improved process for producing resins of the sulphur dioxide-olefin type by which the speed of the polymerization reaction is greatly increased.

Another object is to provide a process giving an increased yield of resin and reducing the amount of reaction mixture which must be handled per unit weight of product.

A further object of my invention is to provide a process which produces sulphur dioxide-olefin resins having improved physical characteristics.

Other objects and advantages of the invention will become apparent from the following description.

I have discovered that the polymerization reaction between sulphur dioxide and active unsaturated compounds of the olefin type may be tremendously accelerated by carrying out the reaction in the presence of terpene peroxide and small amounts of halogen acid. When using my improved process the speed with which the reaction takes place is greatly increased, and the reaction time is greatly reduced.

According to the preferred embodiment of the invention, the reaction is carried out in the presence of ascaridole, a naturally occurring terpene peroxide that is readily available, and halogen acid.

Optimum results are secured by using ascaridole and hydrogen chloride. Other halogen hydrides, such as hydrogen fluoride and hydrogen bromide, may be employed, but to somewhat less advantage. Hydrogen iodide is the least effective.

An important feature of the new process consists in its utility when used in conjunction with the process disclosed in the copending application of R. C. Hills and myself, Serial No. 257,336, filed Feb. 20, 1939. According to an embodiment of that process, the reaction between sulphur dioxide and olefin is carried out in the presence of an excess of the olefin, with or without an additional solubility regulator, such that the molar ratio of solubility regulator to sulphur dioxide in the reaction mixture is preferably at least 3 to 1. A granular resin that is easy to wash is obtained from this reaction. In the practice of said embodiment, using known catalysts, it has been difficult, if not impossible, to obtain yields higher than 30-40% of the theoretical yield. On the other hand, when using ascaridole and halogen acid as the catalyst in a reaction mixture containing a large excess of olefin, according to a preferred embodiment of the present invention, I am able to obtain yields of 85-90%, and the color of the resinous product, and also other physical properties such as its molding temperature, are considerably improved.

In the practice of the present process, the halogen acid may be added to the reactants either as such or in a solution. Also, materials which hydrolyze or decompose to yield halogen acid may be added to the reaction mixture, so long as the reaction takes place in the presence of halogen acid. For example, the sulphur dioxide-olefin reaction is greatly accelerated when carried out in the presence of ascaridole and acetyl chloride, the effective activating agent for the ascaridole being the small quantity of hydrogen chloride which is always associated with acetyl chloride.

If terpene peroxide and halogen acid are mixed together before addition to the reactants, the mixture should not be allowed to stand for any substantial period of time, as I have found that it is no longer catalytically active after standing for a few minutes. A suitable procedure is to add the terpene peroxide to the reaction mixture and then to add the material or solution which conveys halogen acid into the mixture. Another suitable procedure is to add a terpene peroxide-halogen acid mixture to the reaction mixture in several successive portions. This is advantageous in that it results in very high yields of resin. For example, yields of the order of 90-100% are obtainable in the production of $SO_2$-butene-1 and $SO_2$-butene-2 resins.

The following examples illustrate the manner in which my invention may be carried out:

Example 1

A glass container holding a mixture of butene-1 and $SO_2$ in the molar ratio of 2:1 is cooled with dry ice and ether. To this mixture is added .5%, by weight, of ascaridole, followed by 1.0%, by weight, of hydrogen chloride dissolved in a small quantity of alcohol. The container is sealed off and allowed to warm up to room temperature. The reaction begins within one minute and is completed within 30 minutes.

Example 2

A glass container is cooled in dry ice and ether and a mixture of equal volumes of butene-2 and $SO_2$ is run in. This corresponds to a molar ratio of olefin to $SO_2$ of 1:2. Two percent of ascaridole, dissolved in about 5%, by volume, of ethyl alcohol, and about 2½%, by volume, of ethyl alcohol saturated with hydrogen chloride are added. The container is sealed off and placed in a bath maintained at about 0° C. Reaction begins within about one minute. A 75% yield of resin is obtained in 30 minutes.

I do not know the explanation for the greatly increased catalytic effect of ascaridole in the presence of halogen acid, but I believe that this activity is due to energy liberated in a rearrangement of the ascaridole molecule, caused by the presence, for example, of hydrogen chloride.

It will be understood that the examples and other details set forth in the specification are presented to enable ready adaptation of the invention to actual practice, and that the invention is not restricted to the details of this disclosure except as required by the appended claims.

I claim:

1. The process for producing resins of the sulphur dioxide-olefin type which comprises reacting sulphur dioxide and olefin in the presence of a substantial molar excess of olefin and in the presence of catalyzing material comprising ascaridole and halogen hydride.

2. The process for producing resins of the sulphur dioxide-olefin type which comprises reacting sulphur dioxide and olefin in the presence of a substantial molar excess of olefin and in the presence of catalyzing material comprising ascaridole and hydrogen chloride.

3. The process of producing resins of the sulphur dioxide-olefin type which comprises introducing sulphur dioxide and olefin into a reaction vessel, adding ascaridole and halogen hydride thereto, sealing the vessel, and maintaining the vessel at temperatures between 0° C. and room temperature during the course of the resulting reaction.

4. The process of producing sulphur dioxide-olefin resins which comprises reacting sulphur dioxide and an olefinic hydrocarbon of from 2 to 5 carbon atoms in the presence of ascaridole and a halogen hydride.

5. The process of producing sulphur-dioxide-olefin resins which comprises reacting sulphur dioxide and an olefinic hydrocarbon of from 2 to 5 carbon atoms, the latter being present in the reaction mixture in a quantity amounting to at least about 2 mols to each mol of sulphur dioxide, the reaction being carried out in the presence of ascaridole and a halogen hydride.

6. The process of producing sulphur dioxide-olefin resins which comprises reacting sulphur dioxide and butene in the presence of ascaridole and a halogen hydride.

7. The process of producing sulphur dioxide-olefin resins which comprises reacting sulphur dioxide and butene, the latter being present in the reaction mixture in a quantity amounting to at least about 2 mols to each mol of sulphur dioxide, the reaction being carried out in the presence of ascaridole and a halogen hydride.

8. The process for producing resins of the sulphur dioxide-olefin type which comprises reacting an olefin with sulphur dioxide in the presence of ascaridole and halogen hydride.

9. The process for producing resins of the sulphur dioxide-olefin type which comprises reacting an olefin with sulphur dioxide in the presence of ascaridole and hydrogen chloride.

10. The process for producing resins of the sulphur dioxide-olefin type which comprises introducing sulphur dioxide and an olefin into a reaction vessel and adding proportions of ascaridole and hydrogen chloride to the resulting mixture to activate reaction.

MAXWELL M. BARNETT.